Patented Sept. 20, 1932                          1,878,168

UNITED STATES PATENT OFFICE

FRIEDRICH MUTH AND ALBERT SCHMELZER, OF ELBERFELD, GERMANY, ASSIGNORS TO GENERAL ANILINE WORKS, INC., OF NEW YORK, N. Y., A CORPORATION OF DELAWARE

1-AMINO-CARBAZOLE

No Drawing. Application filed May 1, 1928, Serial No. 274,355, and in Germany May 14, 1927.

The present invention relates to a new process of preparing 1-amino-carbazole compounds.

We have found that 1-amino-carbazole compounds can be easily obtained by reacting upon a 1-hydroxy-carbazole compound, which term is intended to include 1-hydroxy-carbazole as well as its derivatives, with ammonia at superatmospheric pressure and at an elevated temperature in the presence of a salt of the group consisting of the ammonium salts and such metallic salts as yield double salts (ammoniacates) with ammonia such as zinc chloride, sodium bisulfite, ammonium bisulfite, ammonium chloride, ammonium acetate, ammonium carbonate, etc., whereby it is to be understood that the ammonium salts may often perform the reaction without the addition of ammonia, the latter being formed by the dissociation of the ammonium salts at higher temperatures. Suitably the reaction is performed at temperatures between about 100° C. and the melting point of the 1-amino-carbazole compounds being formed during the reaction in an autoclave and in the presence of an inert solvent such as water or an alcohol, wherein the ammonia and the salt may be dissolved; a pressure of about 10-12 atmospheres and a temperature of about 150-160° C. being preferred conditions of working in most cases.

The following examples illustrate our invention without limiting it thereto, the parts being by weight:

*Example 1.*—18.3 kg of 1-hydroxy carbazole are heated for several hours with 200 litres of an approximately 10% aqueous ammonium bisulfite solution in an autoclave to 150–160° C. whereby the pressure will amount to about 10–12 atmospheres. After cooling, long, white, fibrous crystals separate from the solution. These, when recrystallized from alcohol or benzene, melt at 196–197° C. and consist of pure 1-amino-carbazole.

*Example 2.*—32.1 kg of 3.6-dibromo-1-hydroxy carbazole, prepared by bromination of 1-hydroxy carbazole, are heated as in Example 1 with ammonium bisulfite solution under pressure. 1-amino-3.6-dibromo carbazole is produced by this operation in a good yield.

*Example 3.*—1 part of the potassium salt of 1-hydroxy-carbazole-3.6-disulfonic acid is heated in a sealed tube with 2,5 parts of ammoniumchloride and 10 parts of an aqueous ammonia solution of 10% strength for about 15 hours to a temperature of about 250–260° C. After cooling the content of the tube is diluted with a little water, filtered from a small amount of decomposition products, rendered alkaline and boiled until the remaining ammonia has escaped. Now the solution is acidified, filtered from a small amount of unchanged 1-hydroxycarbazole-3.6-disulfonic acid, and the 1-aminocarbazole-3.6-disulfonic acid is precipitated in form of its alkali metal salt by salting out. If the product is diazotized and coupled with 1-naphthol-4-sulfonic acid a red azo dyestuff is obtained.

We claim:

1. The process which comprises reacting upon a 1-hydroxy-carbazole with ammonia in the presence of a salt of the group consisting of the ammonium salts and such metallic salts as yield double salts with ammonia under superatmospheric pressure and at a temperature between about 100° C. and the melting point of the 1-amino-carbazole formed during the reaction.

2. The process which comprises reacting upon a 1-hydroxy-carbazole with ammonia in the presence of an inert solvent and a salt of the group consisting of the ammonium salts and such metallic salts as yield double salts with ammonia under superatmospheric pressure and at a temperature between about 100° C. and the melting point of the 1-amino-carbazole formed during the reaction.

3. The process which comprises reacting upon a 1-hydroxy-carbazole with ammonia in the presence of water and a salt of the group consisting of the ammonium salts and such metallic salts as yield double salts with ammonia under superatmospheric pressure and at a temperature between about 100° C. and the melting point of the 1-amino-carbazole formed during the reaction.

4. The process which comprises reacting upon a 1-hydroxy-carbazole with ammonia in the presence of water and zinc chloride under superatmospheric pressure between about 100° C. and the melting point of the 1-amino-carbazole formed during the reaction.

5. The process which comprises reacting upon a 1-hydroxy-carbazole with ammonia in the presence of water and sodium bisulfite under superatmospheric pressure between about 100° C. and the melting point of the 1-amino-carbazole formed during the reaction.

6. The process which comprises reacting upon a 1-hydroxy-carbazole with ammonia in the presence of water and an ammonium salt under superatmospheric pressure between about 100° C. and the melting point of the 1-amino-carbazole formed during the reaction.

7. The process which comprises reacting upon a 1-hydroxy-carbazole with ammonia in the presence of water and ammonium chloride under superatmospheric pressure between about 100° C. and the melting point of the 1-amino-carbazole formed during the reaction.

8. Process, which comprises reacting upon 1-hydroxycarbazole with an aqueous ammonium-bisulfite solution at a temperature of 150–160° C. and at a pressure of about 10–12 atmospheres.

In testimony whereof we have hereunto set our hands.

FRIEDRICH MUTH.
ALBERT SCHMELZER.